United States Patent
Kikuchi

(10) Patent No.: US 10,209,609 B2
(45) Date of Patent: Feb. 19, 2019

(54) ELECTRONIC DEVICE HAVING A HEAT SINK, AND PROJECTOR INCLUDING THE ELECTRONIC DEVICE

(71) Applicant: CASIO COMPUTER CO., LTD., Tokyo (JP)

(72) Inventor: Ryo Kikuchi, Hachioji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 15/788,219

(22) Filed: Oct. 19, 2017

(65) Prior Publication Data

US 2018/0173084 A1 Jun. 21, 2018

(30) Foreign Application Priority Data

Dec. 20, 2016 (JP) .................................. 2016-246120

(51) Int. Cl.
G03B 21/16 (2006.01)
G03B 21/20 (2006.01)

(52) U.S. Cl.
CPC ........... G03B 21/16 (2013.01); G03B 21/204 (2013.01); G03B 21/2093 (2013.01)

(58) Field of Classification Search
CPC ... G03B 21/204; G03B 21/16; G03B 21/2093
See application file for complete search history.

(56) References Cited

U.S. PATENT DOCUMENTS

| 2008/0018863 A1* | 1/2008 | Hsiao | G03B 21/16 353/54 |
| 2009/0195756 A1* | 8/2009 | Li | G03B 21/16 353/54 |
| 2009/0236076 A1* | 9/2009 | Min | F28D 15/0275 165/80.3 |
| 2010/0165566 A1* | 7/2010 | Li | G06F 1/20 361/679.47 |
| 2010/0172103 A1* | 7/2010 | Du | H01L 23/4093 361/710 |

FOREIGN PATENT DOCUMENTS

JP 2012-123967 A 6/2012

* cited by examiner

*Primary Examiner* — Sultan Chowdhury
*Assistant Examiner* — Magda Cruz
(74) *Attorney, Agent, or Firm* — Fitch, Even, Tabin & Flannery LLP

(57) ABSTRACT

An electronic device has a first device holder and a second device holder each having a heat generating device attached thereto, a first heat conductive plate and a second heat conductive plate which are connected to the first and second device holders, respectively, a first heat dissipating fin disposed by the side of the second device holder which is disposed adjacent to the first device holder, a second heat dissipating fin disposed adjacent to the first heat dissipating fin in the same direction as the first heat dissipating fin, two first heat pipes which connect the first device holder with the first heat dissipating fin so that heat can be conducted therebetween, and a second heat pipe which connects the second device holder and the second heat dissipating fin so that heat can be conducted therebetween and which is disposed between the two first heat pipes.

12 Claims, 10 Drawing Sheets

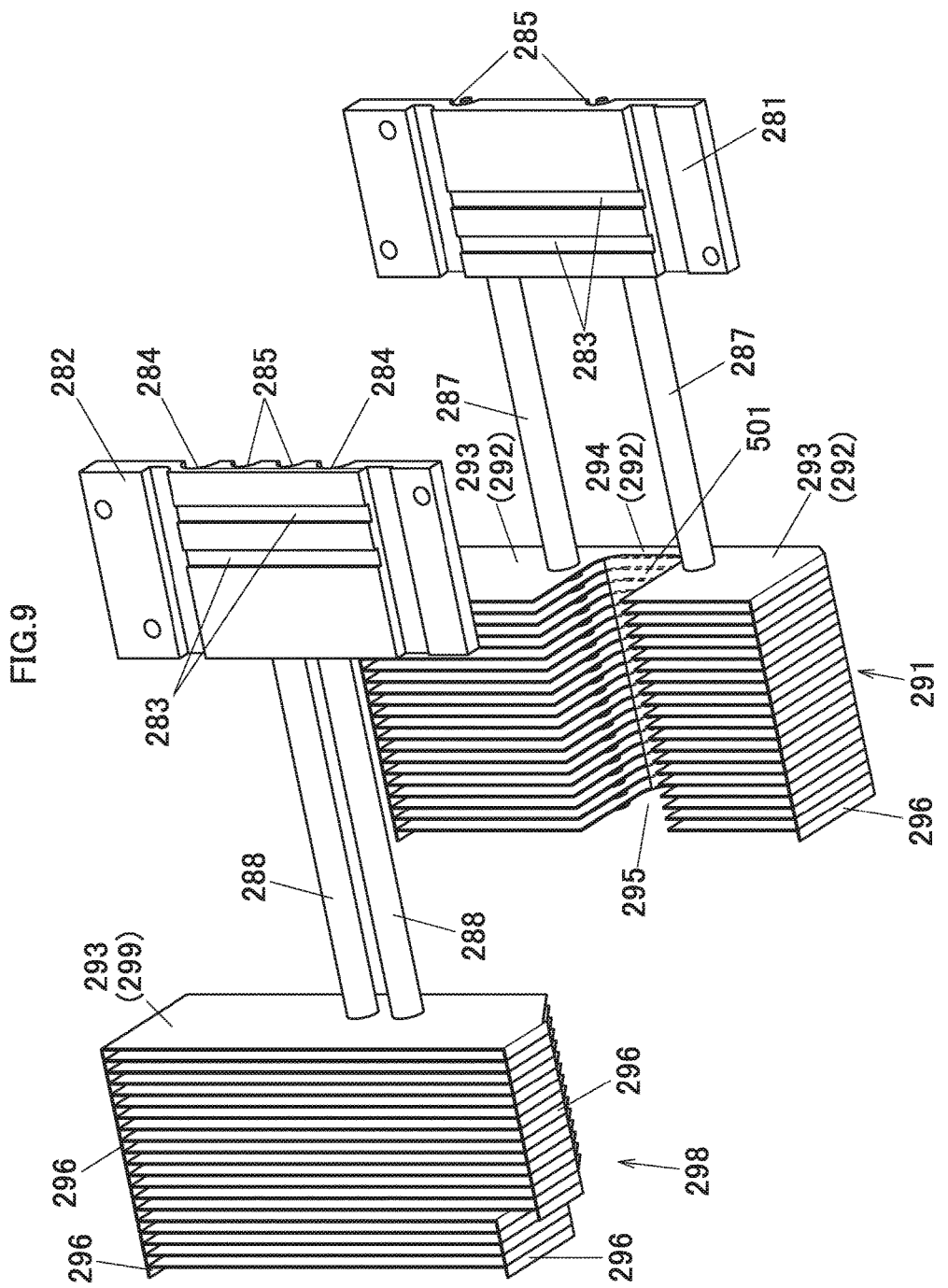

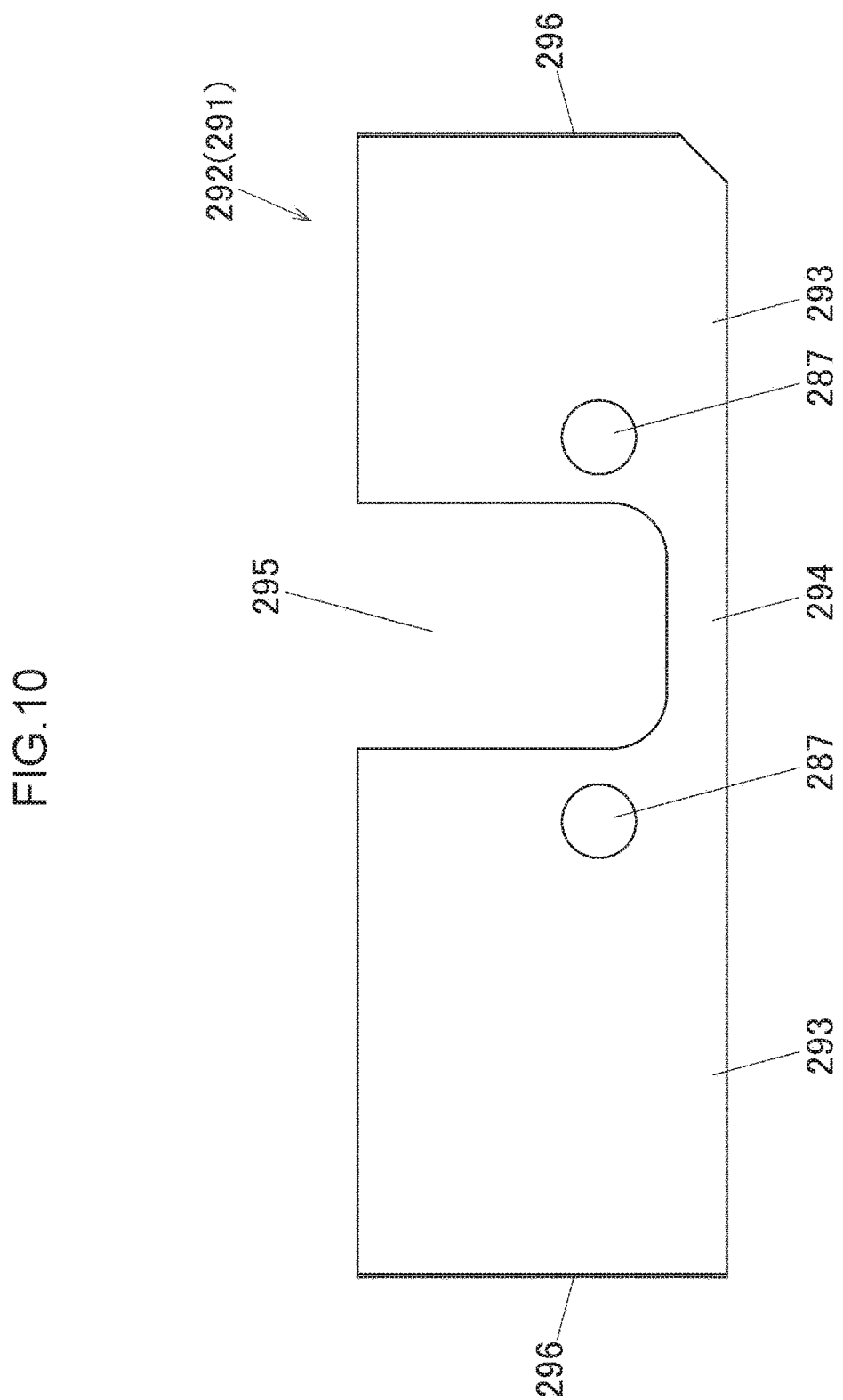

ELECTRONIC DEVICE HAVING A HEAT SINK, AND PROJECTOR INCLUDING THE ELECTRONIC DEVICE

CROSS-REFERENCE TO RELATED APPLICATION

This application is based upon and claims the benefit of priority under 35 USC 119 from Japanese Patent Application No. 2016-246120 filed on Dec. 20, 2016, the entire disclosure of which, including the specification, claims, drawings and abstract, is incorporated herein by reference.

BACKGROUND OF THE INVENTION

Field of the Invention

The present invention relates to an electronic device and a projector which includes this electronic device.

Description of the Related Art

In these days, data projectors are widely used on many occasions as a projection system for projecting a screen and a video screen of a personal computer and images based on image data recorded on a memory card or the like. In a mainstream of these projectors, a highly bright discharge lamp is used as a light source. However, in recent years, many developments and proposals have been made on usage of a light emitting diode (LED), a laser light emitting device, an organic EL or a luminescent material as a light emitting device for a light source device.

The applicant of this patent application proposed, in Japanese Unexamined Patent Publication No. 2012-123967, a projector which can emit highly bright image light by using a laser light emitting device as a light source and forming bright image forming light source light through a combination of laser light and luminous light which is generated by shining laser light on to a luminescent material as excitation light.

A light source unit using semiconductor light emitting device such as laser light emitting devices and a luminescent material light emitting plate can easily form highly bright primary colors of light for projecting a bright image. However, the light sources for emitting highly bright light produce much heat, and it has been difficult to provide a light source unit which is small in size and which can provide a high cooling and heat dissipating effect.

In a case where a plurality of light emitting devices are used as highly bright light sources in a projector, the light emitting devices need to be arranged with light emitting surfaces of the plurality of light emitting devices aligned with a reference plane. Then, when device holders for holding the light emitting devices are disposed close to one another, there has been caused, from time to time, a problem that rear surfaces of side surfaces of the device holders are not arranged on the same plane due to production errors of the device holders.

Because of this, in dissipating heat by bringing the rear surfaces or the like of the device holders into contact with heat conductive plates or the like, there has been a situation in which a slight gap is generated on a heat conductive plane which constitutes a heat conductive path to a heat dissipating device such as a heat sink, resulting in a reduction in cooling effect of cooling the light sources which are the heat generating devices.

SUMMARY OF THE INVENTION

The invention has been made in view of the problem described above, and an object thereof is to provide an electronic device which can dissipate heat of a heat generating device acting as a light source effectively and a projector which includes this electronic device.

According to an aspect of the invention, there is provided an electronic device including a first device holder and a second device holder each comprising a heat generating device attached thereto, a first heat conductive plate and a second heat conductive plate which are connected to the first device holder and the second device holder, respectively, a first heat dissipating fin which is disposed by the side of the second device holder which is disposed to lie adjacent to the first device holder, a second heat dissipating fin which is disposed adjacent to the first heat dissipating fin in the same direction as the first heat dissipating fin, two first heat pipes which connect the first device holder with the first heat dissipating fin so that heat can be conducted therebetween, and a second heat pipe which connects the second device holder and the second heat dissipating fin so that heat can be conducted therebetween and which is disposed between the two first heat pipes.

According to another aspect of the invention, there is provided a projector including the electronic device described above, a display device on to which light emitted from the electronic device is shone to form image light, a projection optical system for projecting the image light formed at the display device on to a screen, and a projector control unit for controlling the display device and the electronic device, wherein the heat generating device includes a semiconductor light emitting device.

BRIEF DESCRIPTION OF THE SEVERAL VIEWS OF THE DRAWINGS

FIG. 9 is an exploded perspective view showing the joint surface side of the cooling device for use for the light source device according to the embodiment of the invention.

FIG. 10 is a side view of a first cooling fin of the light source device according to the embodiment of the invention.

DETAILED DESCRIPTION OF THE PREFERRED EMBODIMENT

Figure 1:
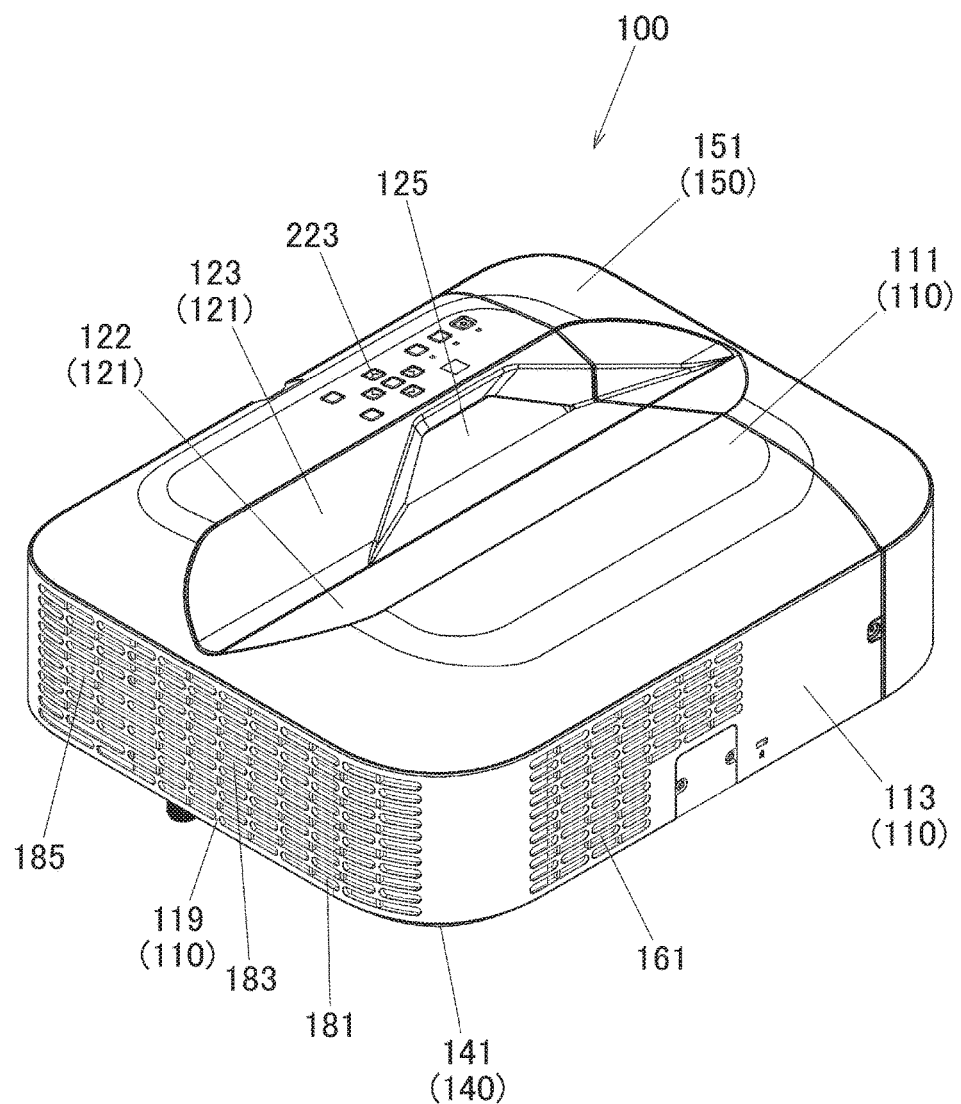
FIG. 1 is an external perspective view of an example of a projector according to an embodiment of the invention.

Hereinafter, an embodiment of the invention will be described in detail based on the drawings. FIG. 1 is an external perspective view of a projector 100 which is an image projection system. In this embodiment, when left and right are referred to in relation to the projector 100, they denote, respectively, left and right in relation to a projecting direction of the projector 100, and when front and rear are referred to in relation to the projector 10, they denote, respectively, front and rear in relation to the projecting direction of the projector 100. In addition, in FIG. 1, a right obliquely downward direction denotes a front of the projector 100.

Figure 2:
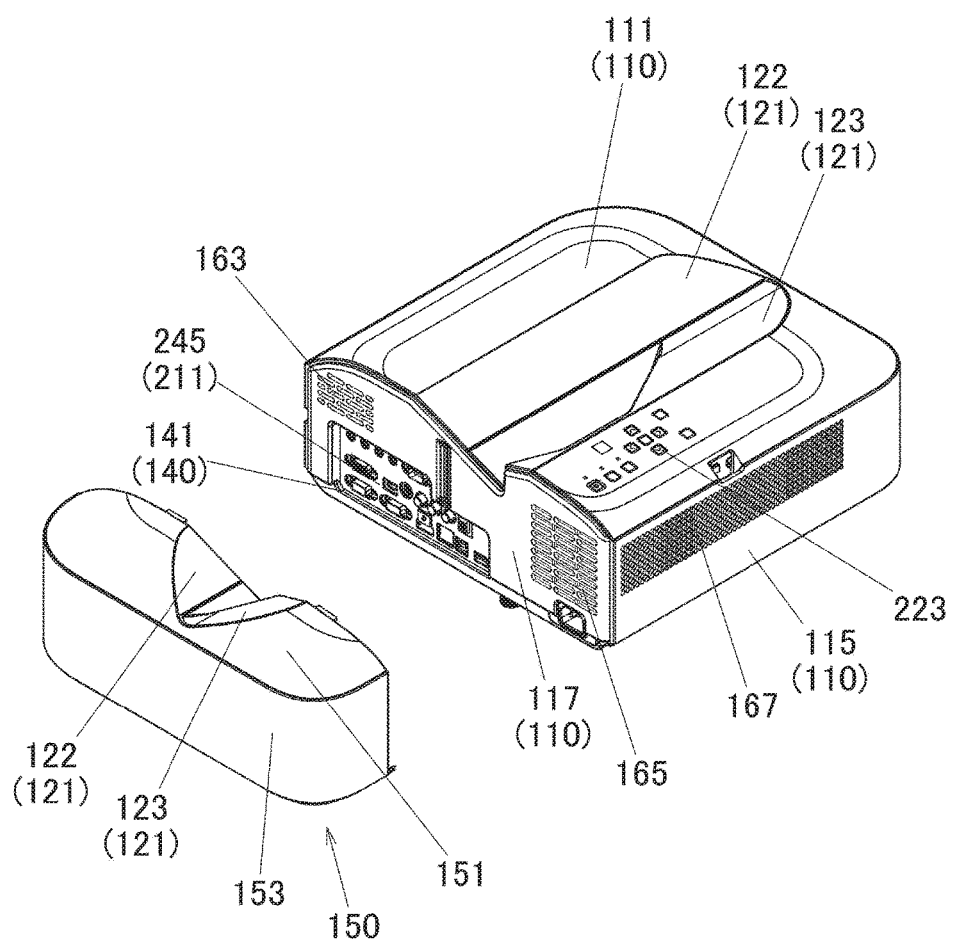
FIG. 2 is a rear external perspective view of the projector according to the embodiment of the invention, showing a state in which a connector cover is removed.

As shown in FIGS. 1 and 2, the image projection system is the projector 100 which has a substantially rectangular parallelepiped shape. Various types of devices and circuit boards are fixed to an upper surface of a bottom plate 141 of a lower case 140 of the projector 100 and are then covered by an upper case 110.

Then, front outside air inlet holes 161 are formed in a front panel 113 of the upper case 110 which makes up a casing of the projector 100. Front inside air outlet holes 181, central inside air outlet holes 183 and rear inside air outlet holes 185 are formed at a front portion, a central portion and a rear portion of a right panel 119, respectively.

The projector casing is made up of a casing main body which is made up, in turn, of the upper case 110 and the lower case 140, and a connector cover 150 which covers a left panel 117 of the casing main body while being configured so as to be attached to or detached from the casing main body.

In addition, a keys/indicators unit 223 is provided on an upper panel 111 of the upper case 110. Disposed on this keys/indicators unit 223 are keys and indicators which include a power supply switch key, a projection switch key, a power indicator, an overheat indicator, and the like. The projection switch key switches on or off the projection by the projector 100. The power indicator informs whether a power supply is on or off. The overheat indicator informs of an overheat condition occurring in a light source unit, a display device, a control unit or the like when they really overheat.

Further, a V-shaped cut groove 121 made up of a front inclined portion 122 and a rear inclined portion 123 is formed on the upper panel 111 of the upper case 110 so as to extend in a left-right or transverse direction thereof from a right side of the casing main body to the connector cover 150 which is provided on a left side of the casing main body. A projection port 125 is formed in the rear inclined portion 123, so that image light can be emitted obliquely to the front from the projection port 125.

Then, the connector cover 150 has, as shown in FIG. 2, an upper surface portion 151 and a side surface portion 153 which is provided along a circumferential edge of the upper surface portion 151 so as to extend downwards therefrom so that the left panel 117 of the upper case 110 can be covered by the connector cover 150. The connector cover 150 has opening portions which are formed in a lower surface portion and a right side surface portion thereof, which are not shown, so that cords of various connectors which are connected to a connector board 145 on the left panel 117 of the upper case 110 can be led out downwards of the casing therethrough.

The connector board 245, which is the input/output connector unit 211 which is provided on the left panel 117 lying inwards of the connector cover 150, includes various types of terminals (a group of terminals) such as an SB (seal bus) terminal, a video signal input D-SUB terminal into which analog RGB video signals are inputted, an S terminal, an RCA terminal, a voice output terminal, a power supply adaptor and a plug. Side front outside air inlet holes 163 are provided at a front portion of the left panel 117, and rear side outside air inlet holes 165 are provided at a rear portion of the left panel 117.

Further, rear outside air inlet holes 167 are also provided in a back panel 115 of the upper case 110. Some of the rear outside air inlet holes 167 which are situated near a right end of the back panel 115 double as holes of a speaker from which voice or sound is expelled.

Figure 3:
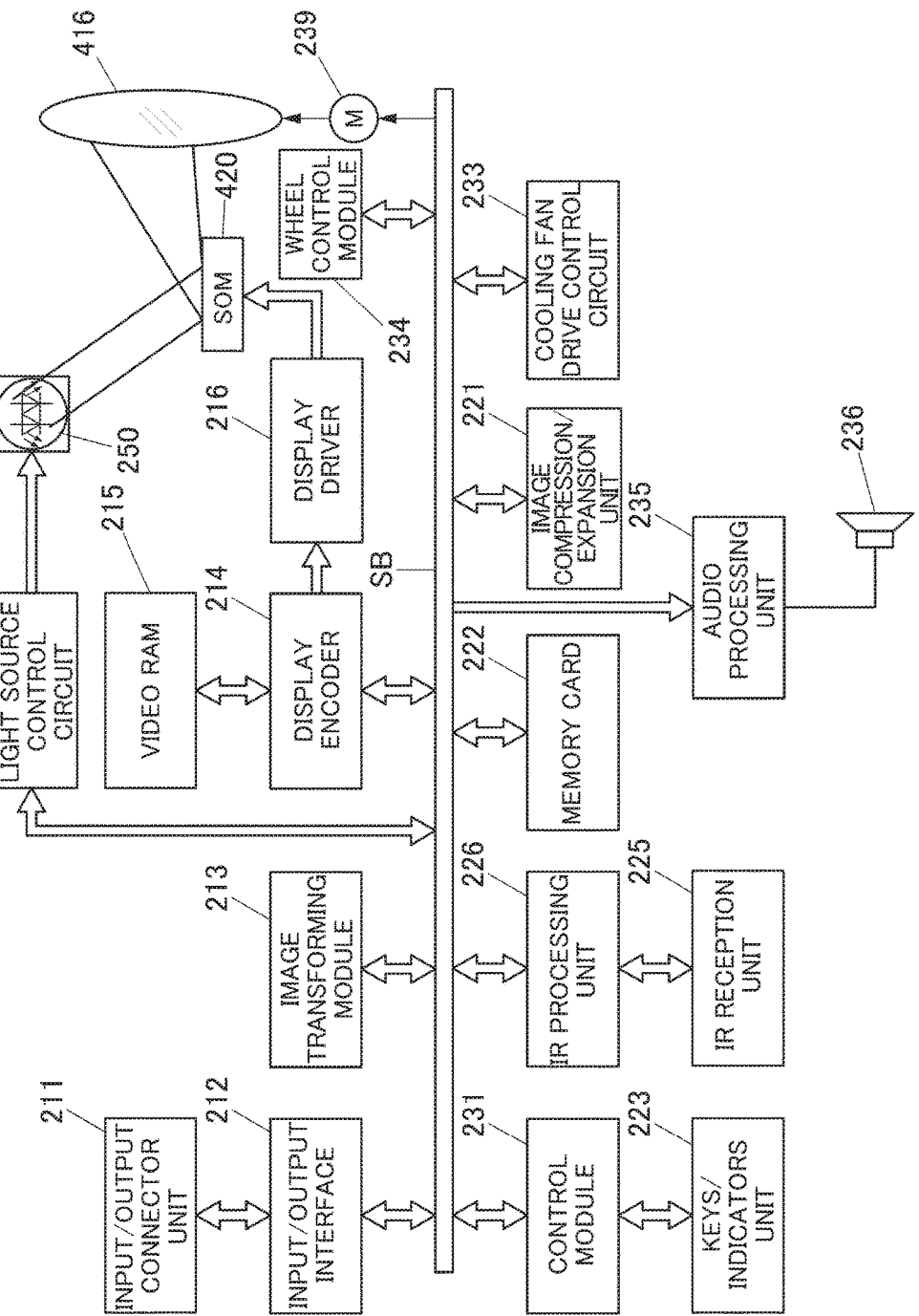
FIG. 3 is a block diagram of functional circuits of the projector according to the embodiment of the invention.

Next, a projector control unit of the projector 100 will be described by the use of a functional block diagram shown in FIG. 3.

The projector control unit includes a control module 231, an input/output interface 212, an image transforming module 213, a display encoder 214, a display driver 216 and the like.

Image signals of various standards which are inputted from the input/output connector unit 211 are sent via the input/output interface 212 and a system bus (SB) to the image transforming module 213 where the image signals are transformed so as to be unified into an image signal of a predetermined format which is suitable for display by the projector control unit. Thereafter, the image signals so transformed are outputted to the display encoder 214.

Then, the control module 231 governs the control of respective operations of circuitries within the projector 100 and is made up of a CPU configured as an arithmetic unit, a ROM which stores in a fixed fashion operation programs of various types of settings, a RAM which is used as a working memory and the like.

The display encoder 214 deploys the image signals that have been inputted thereinto on a video RAM 215 for storage therein and generates a video signal from the contents stored in the video RAM 215, outputting the video signal so generated to the display driver 216.

The display driver 216 functions as a display device control module. The display driver 216 drives a display device 420, which is a spatial optical modulator (SOM), at an appropriate frame rate according to the image signal outputted from the display encoder 214.

As will be described in detail later, this projector 100 includes a light source unit 250 which includes, in turn, a main light source module which has an excitation light shining device 310, a luminous light emitting device 331, a red light source device 350 and a light guiding optical system 370, and a light source-side optical device 380 having a light tunnel 383 and the like.

Then, this projector 100 shines a pencil of light emitted from the main light source module of the light source unit 250 onto the display device 420 via the light source-side optical device 380 so as to form an optical image by using reflected light which is reflected by the display device 420. Then, the image so formed is then projected onto a wall surface or the like for display thereon via a projection optical system, which will be described later.

In addition, the projection optical system has a movable lens group 416, and this movable lens group 416 is driven by a lens motor 239 for zooming or focusing.

When the projector 100 is in a reproducing mode, an image compression/expansion unit 221 performs the following operations. The image compression/expansion unit 221 reads out image data recorded on a memory card 222 and expands individual image data which make up a series of dynamic images frame by frame. Then, the image compression/expansion unit 221 outputs the image data to the display encoder 214 via the image transforming module 213 so as to enable the display of dynamic images and the like based on the image data stored on the memory card 222.

Then, operation signals generated at the keys/indicators unit 223 which is provided on the upper case 110 of the casing are sent out directly to the control module 231. Key operation signals from a remote controller are received by an IR reception unit 225, and a code signal demodulated at an IR processing unit 226 is outputted to the control module 231.

An audio processing unit 235 is connected to the control module 231 via the system bus (SB). This audio processing unit 235 includes a circuitry for a sound source such as a PCM sound source or the like. When the projector 100 is in a projection mode and the reproducing mode, the audio processing unit 235 converts audio data into analog signals and drives a speaker 236 to output loudly sound or voice based on the audio data.

The control module 231 controls a light source control circuit 232 which is configured as a light source control unit. The light source control circuit 232 controls not only the emission of light from each of the excitation light shining device (an excitation light source) 310 and the red light source device 350 of the light source unit 250 but also the rotation of a luminescent material loaded wheel 333 of the luminous light emitting device 331 via a wheel control unit 234 so that light source lights of predetermined wavelength ranges which are required in producing an image are emitted from the main light source module of the light source unit 250.

Further, the control module 231 causes a cooling fan drive control circuit 233 to detect temperatures through a plurality of temperature sensors which are provided in the light source unit 250 so as to control the rotating speeds of cooling fans based on the results of the temperature detections.

Additionally, the control module 231 also causes the cooling fan drive control circuit 233 to keep the cooling fans rotating by use of a timer even after the power supply to the main body of the projector 100 is switched off. Alternatively, the control module 231 causes the cooling fan drive control circuit 233 to cut off the power supply to the main body of the projector 100 depending upon the results of the temperature detections by the temperature sensors.

Figure 4:
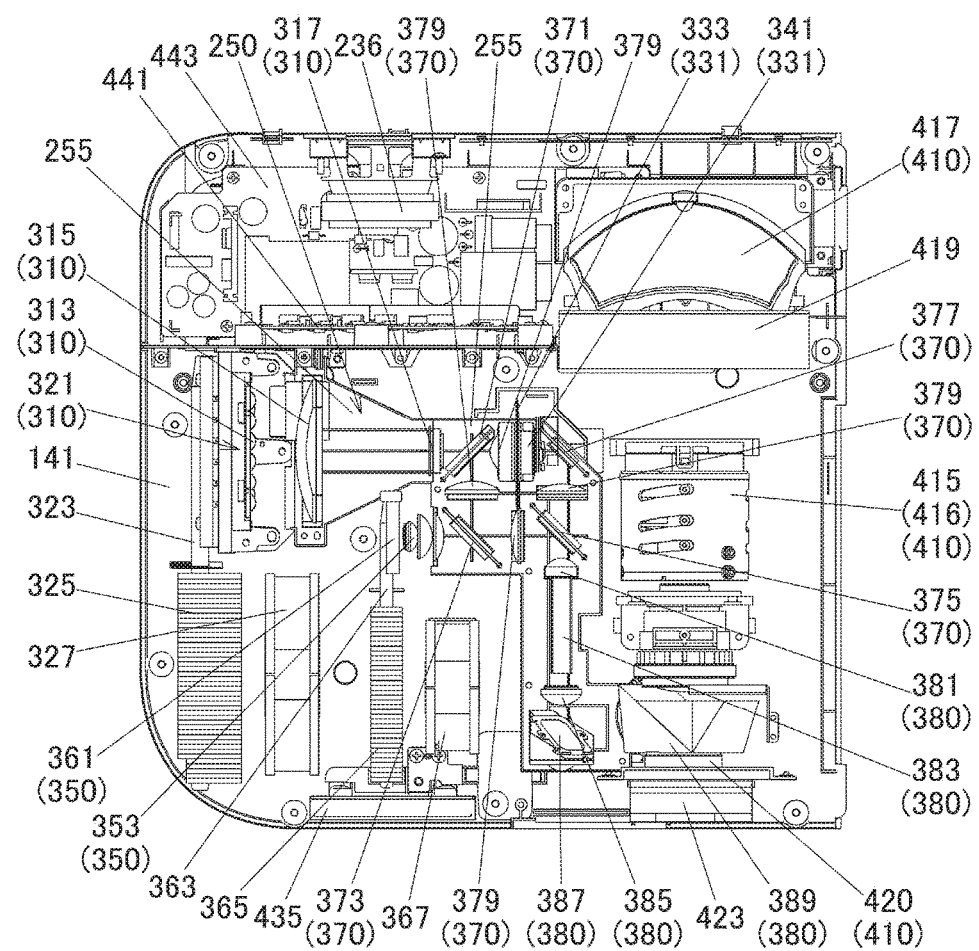
FIG. 4 is a schematic view showing an internal construction of the projector according to the embodiment of the invention.

Next, an internal construction of the projector 100 will be described. FIG. 4 is a schematic view showing an internal construction of the projector 100.

The projector 100, which is the image projection system, includes, as shown in FIG. 4, an excitation light source heat sink 325 made up of heat dissipating fins for cooling an excitation light source, a red light source heat sink 365 made up of heat dissipating fins for cooling a red light source, a first cooling fan 327 and a second cooling fan 367 in a right front position in an interior of the projector 100.

Then, the second cooling fan 367 combines outside air taken in from the side front outside air inlet holes 163 of the left panel 117 to cool heat dissipating fins 423 which are thermally connected to the display device 420 and outside air taken in from the front outside air inlet holes 161 of the front panel 113 together and blows them against the red light source heat sink 365 to cool it.

The first cooling fan 327 combines outside taken in from the front outside air inlet holes 161 and air which is blown out from the second cooling fan 367 to cool the red light source heat sink 365 together and blows them against the excitation light source heat sink 325 to cool it, discharging the outside air and air used to cool the excitation light source heat sink 325 to an exterior of the projector 100 through the front inside air outlet holes 181 of the right panel 119.

A filter 435 is provided on an inner side of the front outside air inlet holes 161 through which the first cooling fan 327 and the second cooling fan 367 take in outside air.

Then, the excitation light shining device 310, which is accommodated in the light source unit 250, is disposed at the rear of the excitation light source heat sink 325. The luminous light emitting device 331 is disposed substantially at a center of the bottom plate 141. Further, as shown in FIG. 4, the light source-side optical device 380 is disposed at a front center of the bottom plate 141, and a projection optical system unit 410 is disposed on a left-hand side of the light source-side optical device 380.

This projection optical system unit 410 includes a digital micromirror device, which is abbreviated to DMD, as a display device 420 at the front thereof. Then, lens groups of the projection optical system which are a fixed lens group and a movable lens group 416 are incorporated in a lens barrel 415 which is disposed at the rear of the display device 420, and an aspheric mirror 417 is disposed at the rear of the lens barrel 415.

The speaker 236 is disposed at the rear of the excitation light shining device 310. Various other circuit boards than a main control circuit board 441 on which the CPU and the memory are mounted and a power supply control circuit board 443 are disposed on an upper surface of the bottom plate 141 of the lower case 140.

In the optical system of the projector 100, which is the image projection system, as shown in FIG. 4, the excitation light shining device 310 is disposed rightwards of substantially the center of the projector 100, and the excitation light shining device 310 is disposed on an excitation light source bottom plate portion 255 of the light source unit 250. This excitation light shining device 310 includes an excitation light source made up of a plurality of laser diodes, collimator lenses 313, a collective lens 315 and a diffuse plate 317.

In the excitation light source, a plurality of blue laser diodes, which are a plurality of semiconductor light emitting devices (heat generating elements), are disposed on each of a plurality of device holders 271, 272 which make up a device holder 321. In this excitation light shining device 310, laser beams emitted from the blue laser diodes are converted into substantially parallel pencils of light by the collimator lenses 313 to be incident on the collective lens 315. All the laser beams which are collected by the collective lens 315 are incident on the diffuse plate 317 and are then incident on the luminescent material loaded wheel 333 of the luminous light emitting device 331 while the coherency of the laser beams are reduced by the diffuse plate 371.

The main light source module includes, in addition to the excitation light shining device 310, the luminous light emitting device 331 which includes a wheel motor 341 and the luminescent material loaded wheel 333 which is driven to rotate by the motor 341, the red light source device 350 and the light guiding optical system 370, and these constituent members are disposed substantially at the center of the projector 100.

This luminescent material loaded wheel 333 has an arc-shaped diffuse transmission area and an arc-shaped luminescent material loaded area which are disposed circumferentially in an end-to-end fashion so as to form an annular shape on the same circumference. The diffuse transmission area is formed by fitting a transparent base material having light transmitting properties such as glass in a through hole portion which is cut in a rotary plate base material which is a metallic base material of copper or aluminum.

Fine irregularities are formed on a surface of the transparent base material through sandblasting. The transparent base material transmits excitation light from the excitation light shining device 310 while diffusing it and causes the diffused excitation light to be emitted from the light source unit 250 as light of a range of blue wavelengths.

The luminescent material area is formed by forming an annular groove on the surface of the rotary plate base material which is the metallic base material of copper or aluminum, mirror finishing a bottom portion of the groove through silver deposition and laying out a layer of a green luminescent material on the mirror finished surface. When excitation light is shone on to the luminescent material loaded area, light of a range of green wavelengths is emitted from the luminescent material loaded wheel 333 towards the excitation light shining device 310.

The red light source device 350 is a monochrome light emitting device and includes a red light emitting diode and a collective lens group 353. The red light emitting diode, which is a semiconductor light emitting device, is disposed so that an axis thereof becomes parallel to an axis of excitation light which is emitted from the excitation light shining device 310 by a device holder 361. The collective lens group 353 collects light emitted from the red light emitting diode.

The light guiding optical system 370 is made up of dichroic mirrors and collective lenses. Namely, the light guiding optical system 370 is made up of a first dichroic mirror 371 which is disposed between the diffuse plate 317 of the excitation light shining device 310 and the luminescent material loaded wheel 333, a second dichroic mirror 373 which is disposed at the front of the first dichroic mirror 371 in a position on an axis of light emitted from the red light source device 350, a reflecting mirror 377 which is disposed on a left-hand side of the luminescent material loaded wheel 333, a third dichroic mirror 375 which is disposed at the front of the reflecting mirror 377 and on a left-hand side of the second dichroic mirror 373 and collective lenses 379 which are disposed between the dichroic mirrors and between the reflecting mirror 377 and the dichroic mirror.

The first dichroic mirror 371 transmits light of the range of blue wavelengths and reflects light of the range of green wavelengths. Consequently, the first dichroic mirror 371 transmits excitation light from the excitation light shining device 310 so as to be shone onto the luminescent material loaded wheel 333 and reflects luminous light emitted from the luminescent material loaded wheel 333 to the front of the projector 100.

The second dichroic mirror 373 transmits light of a range of red wavelengths and reflects light of the range of green wavelengths. Consequently, the second dichroic mirror 373 reflects light of the range of green wavelengths which is reflected by the first dichroic mirror 371 to be incident thereon by way of the collective lens 379 to the left of the projector 100 and transmits light of the range of red wavelengths emitted from the red light source device 350 so that an axis thereof is aligned with an axis of the light of the range of green wavelengths reflected by the second dichroic mirror 373.

The reflecting mirror 377 reflects light of the range of blue wavelengths which is excitation light emitted from the excitation light shining device 310 and which passes through the diffuse transmission area of the luminescent material loaded wheel 333 to the front of the projector 100.

Then, the third dichroic mirror 375 transmits light of the range of blue wavelengths and reflects light of the range of green wavelengths and light of the range of red wavelengths. Consequently, the third dichroic mirror 375 transmits light of the range of blue wavelengths from the reflecting mirror 377 and reflects light of the range of red wavelengths which passes through the second dichroic mirror 373 and light or the range of green wavelengths which is reflected by the second dichroic mirror 373, so that the light or the range of blue wavelengths, the light of the range of green wavelengths and the light of the range of red wavelengths are emitted towards the light source-side optical device 380 provided at the front of the third dichroic mirror 375 while causing axes of the blue, green and red lights to be aligned with one another.

This light source-side optical device 380 guides the light source lights to the display device 420 of the projection optical system unit 410 while distributing intensities of the light source lights uniformly and is made up of collective lenses 381, 385, a light tunnel 383 and a light axis turning mirror 387.

In the light source-side optical device 380, the light source lights which travel by way of the third dichroic mirror 375 of the main light source module 330 are collected by the collective lens 381 to be incident on the light tunnel 383, where the intensities of the light source lights are distributed uniformly. Further, the lights which exit from the light tunnel 383 where their intensities are distributed uniformly are collected by the collective lens 385 to be shone onto the light axis turning mirror 387. Then, the lights which are reflected by the light axis turning mirror 387 are caused to be incident on the projection optical system unit 410.

The light axis turning mirror 387 turns the axes of the lights which exit from the light tunnel 383 through 90 degrees to the left so that the lights are reflected obliquely upwards at an angle of 45 degrees in parallel to the display device 420 and the front panel 113.

In this way, the light source lights whose traveling directions are turned by the light axis turning mirror 387 travel so as to be parallel to an incident surface of the display device 420 to be incident on a TIR prism 389 which is disposed closest to a front surface of the display device 420 and are then shone onto an image forming surface of the display device 420.

Then, the projection optical system unit 410 has the TIR prism 389 which is disposed closest to the front surface of the display device 420, and when the lights from the light axis turning mirror 387 are incident on the TIR prism 389, the incident lights are shone onto the display device 420. Then, image light which is formed by the display device 420 is shone onto the aspheric mirror 417 which is positioned at the back of the projector 100 by way of the fixed lens group and the movable lens group 416 which are incorporated in the lens barrel 415 which is situated further rearwards than the display device 420 in the projector 100.

The image light which is reflected by the aspheric mirror 417 is emitted from the projection optical system unit 410 by way of a glass cover 419 which is attached to a projection unit case and then passes through the projection port 125 in the upper case 110 to thereby be projected onto a screen.

Then, a plurality of heat pipes 323 are attached to an external surface of the device holder 321 of the excitation light shining device 310, and the heat pipes 323 extend horizontally in a lateral direction of the excitation light shining device 310 (towards the front of the projector 100) so as to connect to the excitation light source heat sink 325.

A heat pipe 363 is also attached to an external surface of the device holder 361 which holds a red light source of the red light source device 350, and the red light source heat sink 365 which is provided to a side of the main light source module 330 and the device holder 361 are connected together by the heat pipe 363.

Figure 6:
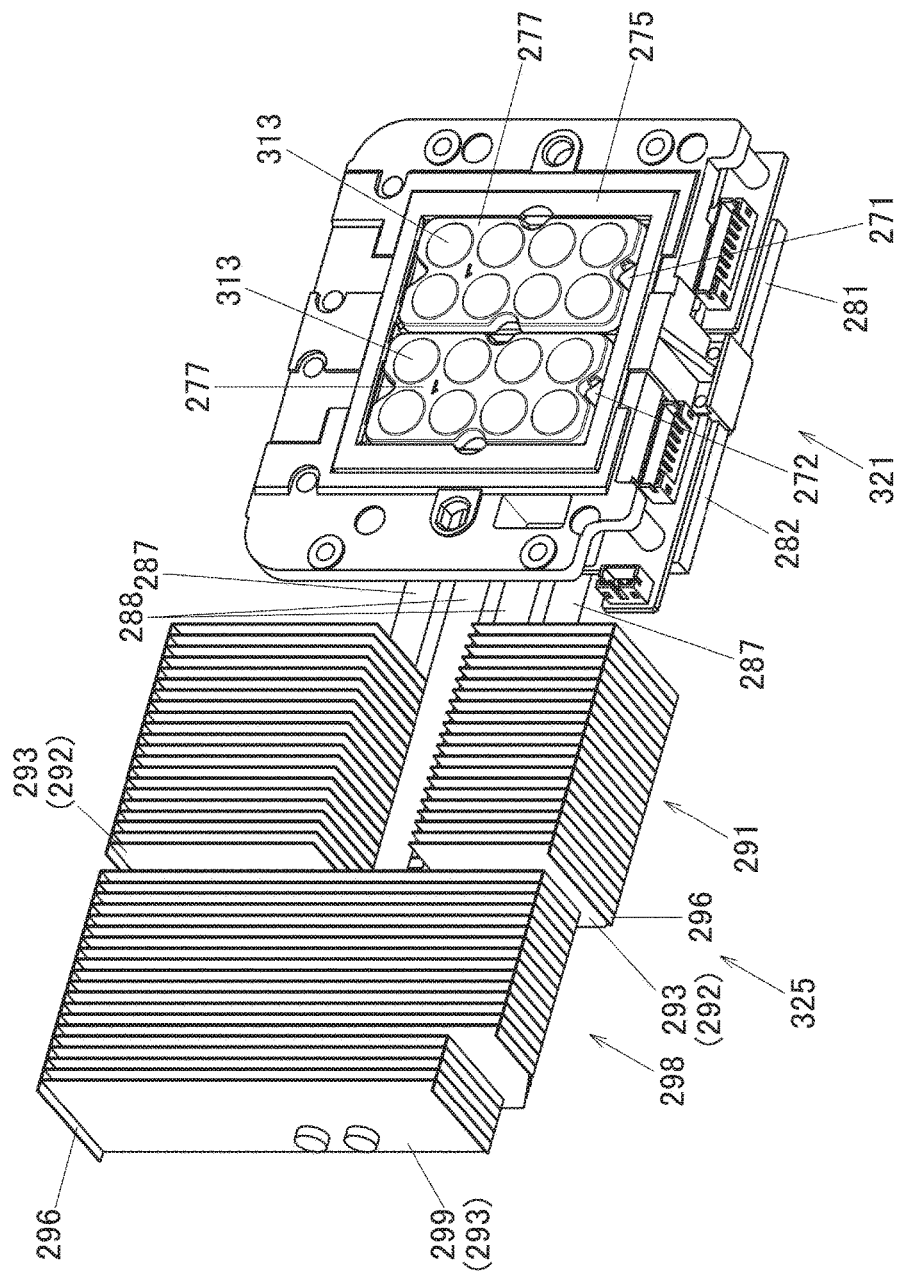
FIG. 6 is a perspective view of the light source device according to the embodiment of the invention, showing a light emitting surface side thereof.

In the excitation light source of the excitation light shining device 310, eight laser emitting devices made up of two columns of four laser emitting devices are fixedly fitted in one rectangular holder. Thus, as shown in FIG. 6, the first device holder 271 and the second device holder 272 (refer to FIG. 7) are inserted and fixed in place in a holder case 275, each of the first and second device holders 271, 272 having a lens array 277 which includes the eight laser emitting devices and eight collimator lenses 313 which are provided so as to correspond individually to the eight laser emitting devices.

Figure 5:
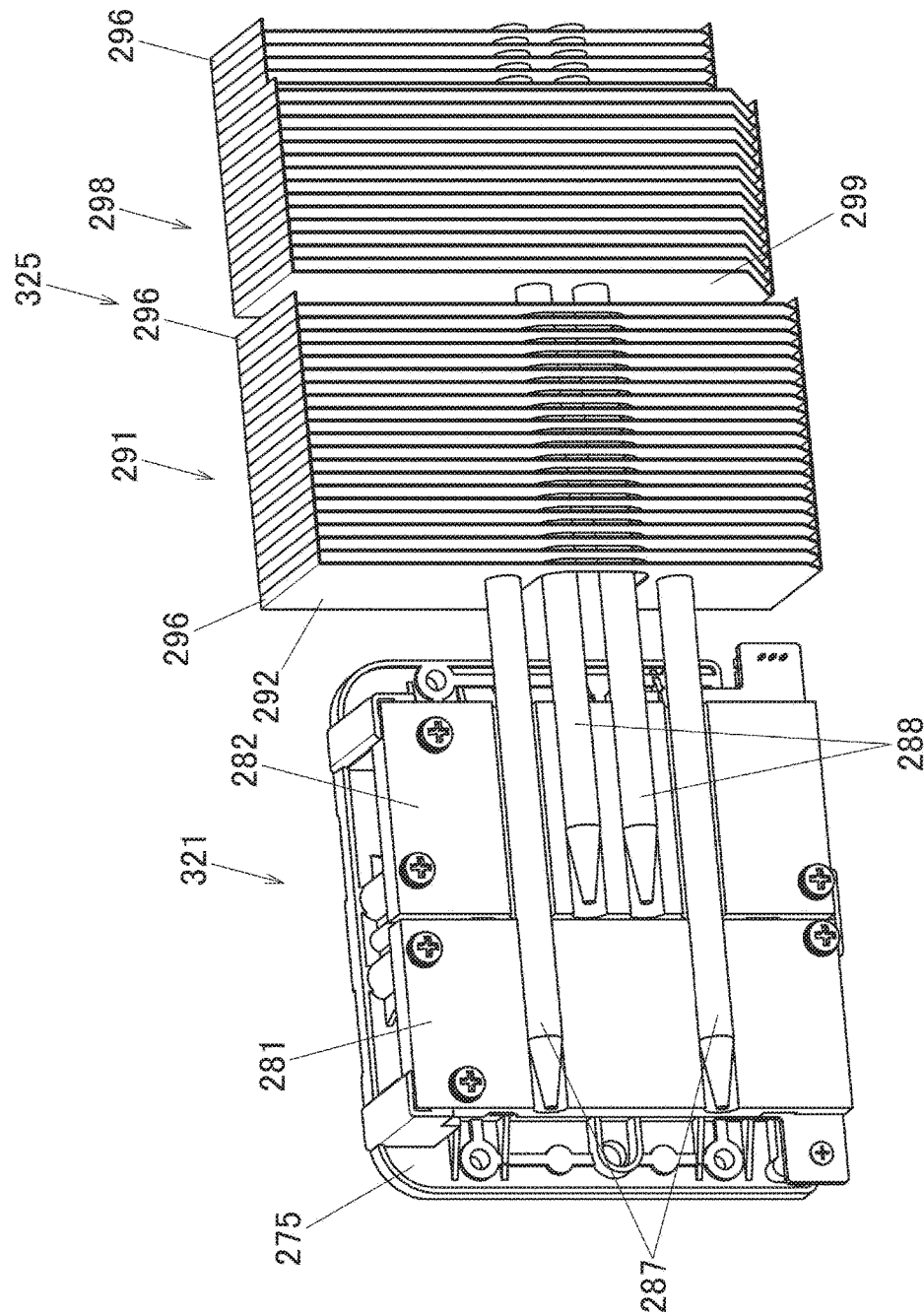
FIG. 5 is a perspective view of a light source device according to the embodiment of the invention, showing a rear surface side thereof.

Then, as shown in FIG. 5, a first heat conductive plate 281, which takes the form of a rectangular thick plate, is closely fixed to a rear surface of the first device holder 271, and a second heat conductive plate 282, which similarly takes the form of a rectangular thick plate, is also closely fixed to a rear surface of the second device holder 272. A first heat dissipating fin 291 is attached to the other ends of first heat pipes 287 which are attached to the first heat conductive plate 281 at ends thereof, and a second heat dissipating fin 298 is attached to the other ends of second heat pipes 288 which are attached to the second heat conductive plate 282 at ends thereof. Then, the first heat dissipating fin 291 and the second heat dissipating fin 298 make up the excitation light source heat sink 325.

Figure 8:
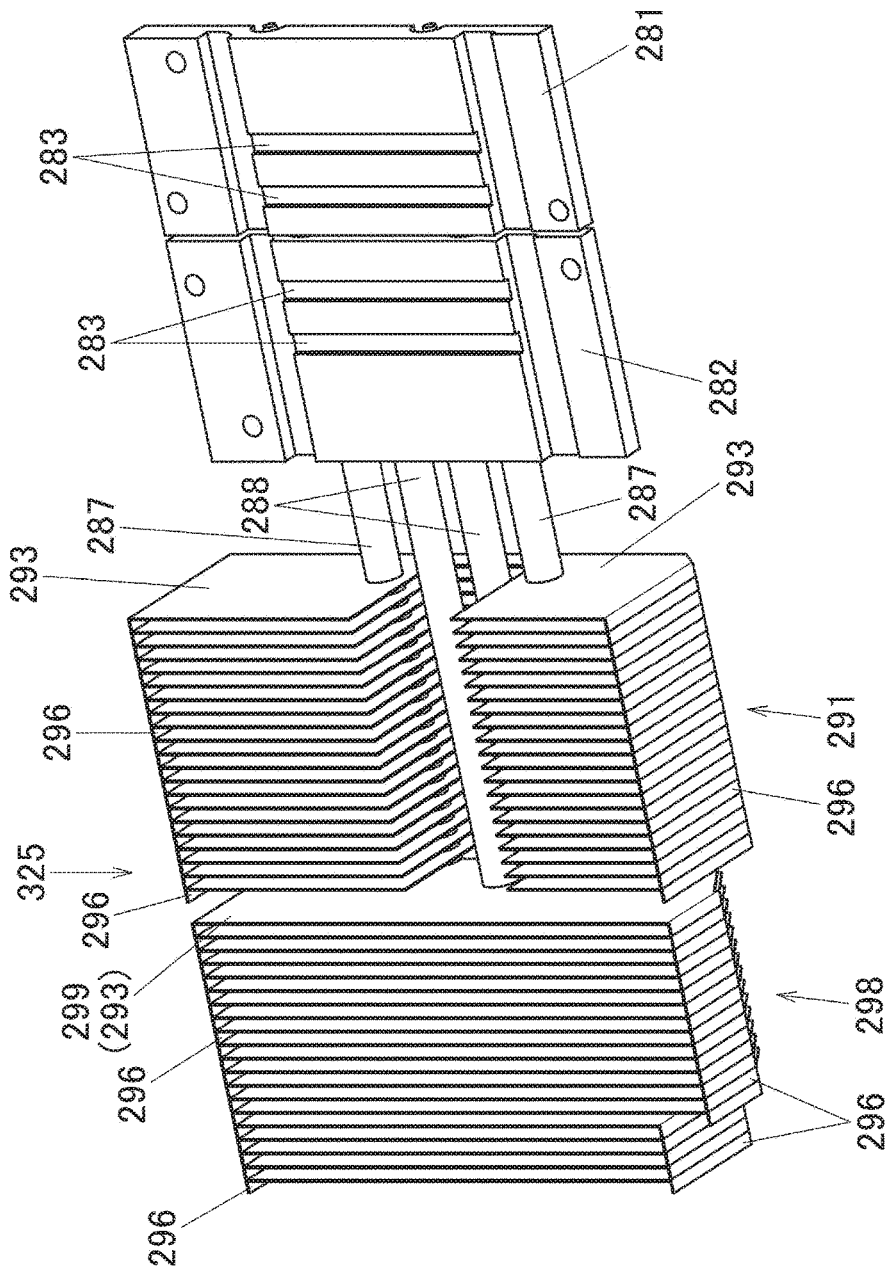
FIG. 8 is a perspective view showing a joint surface side of a cooling device for use for the light source device according to the embodiment of the invention.

As shown in FIG. 8, lead grooves 283 are provided on contact surfaces of the first heat conductive plate 281 and the second heat conductive plate 282 with the device holders 271, 272 to enable lead wires of the blue laser diodes to be led out therethrough so that the contact surfaces of the heat conductive plates 281, 282 can be closely attached to rear surfaces of the device holders 271, 272. Thus, the contact surfaces of the first and second heat conductive plates 281, 282 can be closely attached entirely to the rear surface of the first and second device holders 271, 272, respectively.

Figure 7:
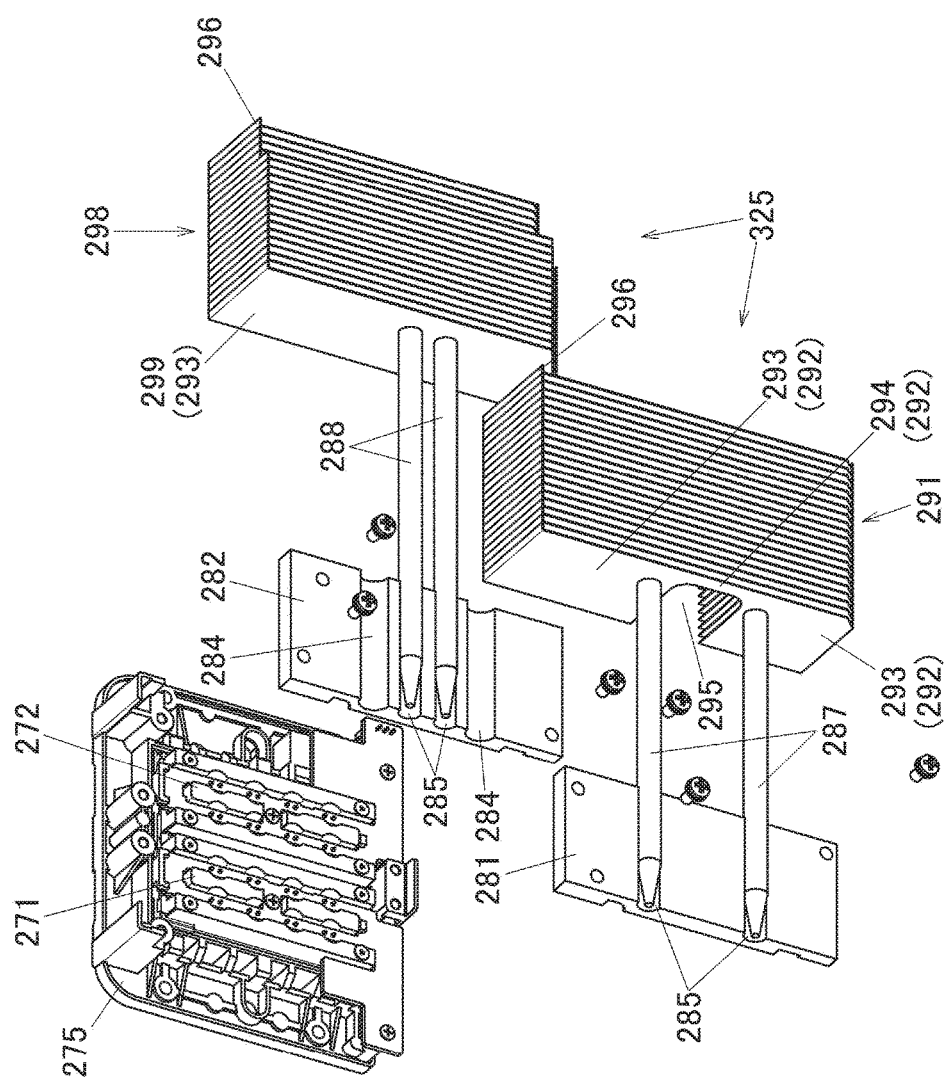
FIG. 7 is an exploded perspective view of the light source device according to the embodiment of the invention.

As shown in FIGS. 7 and the like, on the device holders 271, 272, the pairs of straight heat pipes 287, 288 which are parallel to short sides of the device holders 271, 272 are inserted and fixed in pipe mounting grooves 285 each having a substantially semi-circular cross section. Additionally, pipe grooves 284 each having a substantially semi-circular cross section are formed on the second heat conductive plate 282 so as to lie outwards of the pair of heat pipes which are fixed to the second heat conductive plate 282 and in such a way as to be greater in radius and depth than the pipe mounting grooves 285.

In this way, the first device holder 271 and the second device holder 272 are disposed so that their long sides lie adjacent to each other, and the first heat conductive plate 281 which is closely attached to the rear surface of the first device holder 271 and the second heat conductive plate 282 which is closely attached to the rear surface of the second device holder 272 are disposed to lie adjacent to each other.

Further, the first heat dissipating fin 291 and the second heat dissipating fin 292, which make up the excitation light source heat sink 325, are disposed to lie adjacent to each other by the side of the second heat conductive plate 282 of the first heat conductive plate 281 and the second heat conductive plate 282 which are disposed so that their long sides lie close to each other.

The first heat dissipating fin 291, which is disposed at an inner end which lies nearer to the holder case 275 than the second heat dissipating fin 298, connects to the first heat conductive plate 281, which is disposed at an outer end which lies farther away from the excitation light source heat sink 325, by way of the pair of first heat pipes 287, and the second heat dissipating fin 298, which is disposed at the other outer end which lies farther away from the holder case 275, connects to the second heat conductive plate 282, which is disposed at an inner end which lies nearer to the heat sink, by way of the other pair of heat pipes.

Further, the pair of first heat pipes 287 is disposed so as to lie on outer sides of the pair of second heat pipes 288 which is disposed centrally, and the pair of first heat pipes 287 which is disposed outwards is inserted individually into the pipe grooves 284 on the second heat conductive plate 282 so that the first heat pipes 287 are prevented from being brought into contact with the rear surface of the second heat conductive plate 282. Thus, the four heat pipes are disposed so as to be aligned parallel side by side on the same plane.

As shown in FIGS. 8 to 10 and the like, a cutout portion 295 is provided in the first heat dissipating fin 291 which is disposed inwards so that the pair of second heat pipes 288 attached to the second heat dissipating fin 298 which is disposed further outwards than the first heat dissipating fin 291 are allowed to pass therethrough. Fin plates 292 of the first heat dissipating fin 291 each have wider heat dissipating portions 293 which are formed on both sides of the cutout portion 295, and the wider heat dissipating portions 293 so formed are connected together by a narrow connecting portion 294. Then, the heat dissipating portions 293 of each of the fin plates 292 are fixed to the corresponding first heat pipes 287.

The second heat dissipating fin 298 is made up of a plurality of fin plates 299 which each have almost the same external shape as that of the fin plates 292 of the first heat dissipating fin 291 but do not have the cutout portion 295 and the connecting portion 294. Thus, the whole of each of the fin plates 299 is attached to the pair of second heat pipes 288 as a heat dissipating portion 293.

The fin plates 292 of the first heat dissipating fin 291 and the fin plates 299 of the second heat dissipating fin 298 each have air flow rectifying plates at ends thereof which are formed by bending end edge portions of the heat dissipating portion 293 at right angles to the remaining part of the heat dissipating portion 293. Thus, the air flow rectifying plates project slightly sideways from the heat dissipating portion 293.

In fixing those fin plates 292, 299 respectively to the first and second heat pipes 287, 288 perpendicularly so that the fin plates 292, 299 stay at right angles to the first and second heat pipes 287, 288, the air flow rectifying plates 296 not only function as spacers which form gaps between the individual fin plates 292, 299 but also allow cooling air which passes the gaps so formed between the fin plates 292, 299 to flow from one side surface to the other side surface of the heat dissipating fins 291, 298 while preventing the cooling air from leaking sideways. Thus, heat can be dissipated from the first and second heat dissipating fins 291, 298 with good efficiency by the air flow rectifying plates 296.

In this way, in cooling the highly bright light source which is made up of the first and second device holders 271, 272 which each hold the plurality of laser emitting devices to thereby generate much heat, the first heat conductive plate 281 is closely attached to the rear surface of the first device holder 271, and the second heat conductive plate 282 is closely attached to the rear surface of the second device holder 272. Thus, since the heat conductive plates are provided individually for the first and second device holders 271, 272, even though the rear surfaces of the first and second device holders do not form completely the same plane, the first and second device holders 271, 272 can be closely attached to the corresponding first and second heat conductive plates 281, 282, respectively in an ensured fashion.

Due to this, heat of the light source, which is the heat generating device, is allowed to be conducted to the first and second heat conductive plates 281, 282 in an ensured fashion, so that the heat so conducted can be conducted further to the first and second heat dissipating fins 291, 298 which make up the excitation light source heat sink 325 by way of the first and second heat pipes 287, 288 and can then be dissipated from the first and second heat dissipating fins 291, 298 effectively.

Then, the second heat pipes 288 which fix the second heat dissipating fin 298 which is disposed at the outer end farther away from the holder case 275 are disposed centrally, and the first heat pipes 287 which fix the first heat dissipating fin 291 which is disposed nearer to the holder case 275 are disposed outwards. Due to this, as shown in FIG. 10, in the first heat dissipating fin 291 which is fixed to the first heat pipes 287, the heat dissipating portions 293 are formed on both the sides of the connecting portion 294 where the first heat pipes 287 are fixed by making the width of each fin plate 292 wider than that of the connecting portion 294 at both the sides thereof, and this can maintain the heat dissipating effect at high levels. Additionally, since the cutout portions 295 are provided partially in the fin plates 292 of the first heat dissipating fin 291, the second heat pipes 288 which fix the second heat dissipating fin 298 are allowed to pass easily through the central portion of the first heat dissipating fin 291.

Further, the first heat pipes 287 which fix the first heat dissipating fin 291 which is disposed at the inner end which lies nearer to the holder case 275 are fixed to the first heat conductive plate 281 which is disposed at the outer end which lies farther away from the heat sink 325, and the second heat pipes 288 which fix the second heat dissipating fin 298 which is disposed at the outer end which lies farther away from the holder case 275 are fixed to the second heat conductive plate 282 which is disposed at the inner end which lies nearer to the heat sink 325. This reduces a difference in length between the first heat pipes 287 and the second heat pipes 288 and a difference in heat conductivity from the first heat conductive plate 281 and the second heat conductive plate 282 by the first and second heat pipes 287, 288, whereby the first heat dissipating fin 291 and the second heat dissipating fin 298 can easily cool the first and second device holders 271, 272 uniformly.

In dissipating heat received by the first heat conductive plate 281 from the first heat dissipating fin 291 by way of the first heat pipes 287 and dissipating heat received by the second heat conductive plate 282 from the second heat dissipating fin 298 by way of the second heat pipes 288, since the first heat pipes 287 and the second heat pipes 288 connect straight the heat conductive plates 281, 282 with the corresponding heat dissipating fins 291, 298, the heat received by the heat conductive plates can be transferred to the heat dissipating fins efficiently.

Of the first heat dissipating fin 291 and the second heat dissipating fin 298, in the first heat dissipating fin 291, the cutout portions 295 are provided partially in the fin plates 292, so that the heat pipes 288 which fix the second heat dissipating fin 298 which is disposed at the outer end which lies farther away from the holder case 275 are positioned in the cutout portions 295, allowing the first heat dissipating fin 291 and the second heat dissipating fin 298 to be disposed to be aligned side by side, whereby the excitation light source heat sink 325 can be provided in which the first heat dissipating fin 291 and the second heat dissipating fin 298 are disposed at the substantially similar positions lying near to the first device holder 271 and the second device holder 272.

Due to this, in combining the heat sink, which is the light source heat dissipating device, with the light source, the resulting light source device which is the highly bright light source including the heat dissipating device can be made small in size.

Further, in the first heat dissipating fin 291, which is disposed at the inner end, the fin plates 292 have the cutout portions 295 near the central portions thereof, allowing the portions remaining on both the sides of the cutout portions 295 to constitute the heat dissipating portions 293. Then, the first heat dissipating fin 291 is fixed to the first heat pipes 287 in such a way that the first heat pipes 287 are disposed on both the sides of the second heat pipes 288 which are positioned in the cutout portions 295 and that the first heat pipes 287 pass through the heat dissipating portions 293 of the fin plates 292 of the first heat dissipating fin 291.

Due to this, heat which is conducted from the first heat conductive plate 281 to the first heat dissipating fin 291 by way of the first heat pipes 287 can be dissipated efficiently from the heat dissipating portions 293 which are formed at both the sides of the fin plates 292 of the first heat dissipating fin 291.

Heat which is conducted from the second heat conductive plate 282 to the second heat dissipating fin 298 by way of the second heat pipes 288 can also be dissipated efficiently by the fin plates 299 which extend on both sides of the pair of second heat pipes 288. Thus, heat of all the blue laser diodes which are accommodated in the holder case 275 can be dissipated effectively by the first heat dissipating fin 291 and the second heat dissipating fin 298 which make up the excitation light source heat sink 325.

As shown in FIG. 9, there may be a situation in which a heat conductive tape such as a copper tape is affixed to the connecting portions 294 of the cutout portions 295 of the first heat dissipating fin 291. In this way, by closing the gaps between the individual fin plates 292 by the tape member 501 at the connecting portions 294, cooling air blown against the first heat dissipating fin 291 by a blower fan or the like can be prevented from flowing through the connecting portions 294 where a lower flow resistance than that at the heat dissipating portions 293 is provided to reduce the cooling efficiency of the first heat dissipating fin 291.

Further, the pipe grooves 284 shown in the figures are formed as the grooves having the semi-circular cross section which is greater in diameter than that of the pipe mounting grooves 285, so that the first heat pipes 287 are prevented from being brought into contact with the rear surface of the second heat conductive plate 282 when the first heat pipes 287 extend across the rear surface of the second heat conductive plate 282. However, there may be a situation in which a heat conductive member such as a thermal sheet is inserted into each of the pipe grooves 284 in such a way that the heat conductive member fills a gap between the first heat pipe 287 and an inner surface of the pipe groove 284 provided on the second heat conductive plate so as to bring the first heat pipe 287 and the second heat conductive plate 282 into contact with each other. A sheet member having superior heat conductivity may be used as the heat conductive member. Due to the heat conductive member being affixed to the pipe groove 284, it is desirable to use a material which is flexible and which has characteristics such as superior adherence and non-flammability. Specifically, synthetic resins such as silicone, acryl, polyolefin and the like can be used, and a material can be used in which a ceramic filler or metallic filler is blended.

In this way, there is also the case where the plurality of heat conductive plates are thermally connected to each other by the heat pipes by connecting thermally the heat pipes which extend across the rear surface of the heat conductive plate with the heat conductive plate, so that the heat conductive plate is cooled by the plurality of heat dissipating fins.

Consequently, even with the combination of the plurality of device holders and the plurality of heat dissipating fins in which the plurality of device holders which are thermally independent are cooled individually, the device holders 271, 272 are thermally connected to each other by the heat pipes to realize the cooling device in which the plurality of device holders are cooled by the plurality of heat dissipating fins. By adopting this configuration, even though a failure is caused in a part of the heat conduction paths such as the connection between the heat pipes, the connection between the heat pipes and the heat conductive plates and the connection between the heat pipes and the heat dissipating fins, it is possible to prevent a reduction in heat dissipating effect of dissipating the heat of the light source.

In addition, as shown in FIGS. 5, 10 and the like, in the first heat dissipating fin 291 described above, the cutout portions 295 are provided in the middle positions of the fin plates 292, and the second heat pipes 288 are passed through the positions in the fin plates 292 where the cutout portions 295 are provided. However, a different configuration may be adopted in which a different cutout portion is provided in the fin plate 292 so as to open to one side of the fin plate 292 and through holes are opened in substantially central positions of the fin plate 292 so that the second heat pipes 288 are allowed pass therethrough.

Further, in the embodiment that has been described heretofore, the two device holders 271, 272 are described as making up the light source device. However, the light source device may be a light source device in which a highly bright light source which holds a plurality of light emitting device can be cooled efficiently by three device holders.

As this occurs, three device holders (271, 272 and the like) are fixed in place in a holder case 275 in such a way that long sides thereof are disposed adjacent or close to one another so as to provide a light source in which light emitting surfaces are disposed to lie close to one another. Then, an additional heat dissipating fin is disposed to be aligned with a first heat dissipating fin and a second heat dissipating fin side by side in a direction extending from short sides of the device holders to make up a heat sink. Then, heat conductive plates are provided on rear surfaces of the individual device holders.

Namely, a device holder which is disposed on an opposite side of a first device holder to a side adjoining a second device holder and which is disposed at an outer end which lies farthest away from the heat sink constitutes an additional device holder, and an additional heat conductive plate which is similar to a first heat conductive plate and a second heat conductive plate is closely connected to a rear surface of the additional device holder.

Then, the additional heat dissipating fin is disposed closer to the first heat conductive plate and the second heat conductive plate than the first heat dissipating fin, and additional heat pipes are provided which conduct heat from the additional heat conductive plate to the additional heat dissipating fin.

In this embodiment, too, the first heat conductive plate and the first heat dissipating fin are connected by first heat pipes, and the second heat conductive plate and the second heat dissipating fin are connected by second heat pipes.

Then, in this case, too, the second heat pipes which are fixed to the second heat conductive plate which lies closest to the heat sink are disposed centrally, and the first heat pipes are disposed on outer sides of the second heat pipes. Further, the additional heat pipes are disposed on outer sides of the first heat pipes.

Then, pipe grooves into which the first heat pipes are inserted and pipe grooves into which the additional heat pipes are inserted are provided on outer sides of pipe mounting grooves in which the second heat pipes are fixed in place on the rear surface of the second heat conductive plate, and pipe grooves into which the additional heat pipes are inserted are provided on outer sides of pipe mounting grooves in which the first heat pipes are fixed in lace on the rear surface of the first heat conductive plate. Excluding the second heat dissipating fin which is provided at the outer end which lies farthest from the holder case 275, in the first heat dissipating fin, cutout portions or through holes through which the second heat pipes are passed are formed substantially at centers of fin plates, and in the additional heat dissipating fin, cutout portions or through holes through which the first heat pipes and the second heat pipes are passed are formed near centers of fin plates.

Then, the number of heat pipes attached to the center of the second heat conductive plate which is disposed at the inner end which lies closest to the heat sink may be one. Then, the first heat pipes are disposed on both sides of the second heat pipe, and further, the additional heat pipes are disposed on outer sides of the first heat pipes.

Similar to the first heat pipes and the additional heat pipes, by providing two second heat pipes, heat can be conducted well from the second heat conductive plate to the second heat dissipating fin. On the other hand, by providing one second heat pipe, the overall number of heat pipes can be reduced, whereby the light source device including the cooling device can be made small in size, and the fabrication of the cooling device for the light source device can be facilitated.

In this way, the heat conductive plates and the heat dissipating fins are connected by the heat pipes so that the additional heat pipes which are the heat pipes which connect the additional heat conductive plate which is the heat conductive plate lying farthest away from the heat sink and the additional heat dissipating fin which is the heat dissipating fin lying closest to the holder case together are disposed outwards and the second heat pipes 288 which are the heat pipes which connect the second heat conductive plate lying closest to the heat sink and the second heat dissipating fin 298 which is the heat dissipating fin lying farthest away from the holder case together are disposed centrally. Due to this configuration, in the heat dissipating fins excluding the second heat dissipating fin 298, cutout portions can be formed substantially centers of the fin plates thereof and heat dissipating portions can be formed on both sides of the cutout portions, thereby making it possible to enhance the respective heat dissipating effects of the heat dissipating fins.

Then, by providing the cutout portions substantially at the centers of the heat dissipating fins excluding the second heat dissipating fin which is disposed at the outer end and forming the heat dissipating portions at the ends of the constituent fin plates, the number of device holders, that is, light emitting devices can be increased easily by the additional device holder, and the highly bright light source including many light emitting devices can be cooled efficiently by the additional device holder.

In addition, the fin plates which make up the heat dissipating fins are fixed perpendicularly to the corresponding heat pipes so as to stay at right angles to the heat pipes, and therefore, a high heat dissipating effect can be obtained while simplifying the construction of the heat dissipating fins.

In addition to the case where the heat sink is made up of the heat dissipating fins which are each made up of the fin plates which are fixed directly to the heat pipes so as to be at right angles thereto, a heat sink may be formed which uses heat dissipating fins in each of which a number of fins are erected on a flat base plate portion as heat dissipating fins and heat pipes are fixed to the base plate portion.

In this way, according to the embodiment, the light source device including the highly bright light source having the plurality of device holders can be cooled by the cooling device with the high heat dissipating effect while being made small in size, and therefore, the projector 100 which is the projection system for projecting bright images can easily be made small in size.

In the embodiment described above, while the light source device is described as the excitation light shining device which is the electronic device including the heat generating device, the light source device is not limited to the light source device which is used as the excitation light source but is suitable for cooling the highly bright light source device using the plurality of light emitting devices which are the heat generating device in the projection system. Further, according to the embodiment, the electronic device can be provided which becomes effective in cooling various heat generating devices such as CPU and the like.

Then, in the embodiment described above, the light source device has the first heat conductive plate 281 and the second heat conductive plate 282 which are connected, respectively, to the first device holder 271 to which the heat generating devices are attached and the second device holder 272 to which the heat generating devices are attached. Then, the first heat conductive plate 281 and the second heat conductive plate 282 are disposed adjacent to each other. Further, the first heat conductive plate 281 is connected to the first heat dissipating fin 291 by way of the first heat pipes 287 and the second heat conductive plate 282 is connected to the second heat dissipating fin 298 by way of the second heat pipes 288.

However, the first heat conductive plate 281 and the second heat conductive plate 282 may be positioned reversely without changing the positions of the first heat dissipating fin 291 and the second heat dissipating fin 298. Namely, a configuration may be adopted in which the first device holder 271 which is positioned at one end side is connected to the second heat conductive plate 282 and is then connected to the second heat dissipating fin 298 which is positioned at the other end side by way of the second heat pipes 288 which are positioned almost centrally, while the second device holder 272 is connected to the first heat conductive plate 281 and is then connected to the first heat dissipating fin 291 which is positioned closer to the first heat conductive plate 281 than the second heat dissipating fin 298 by way of the first heat pipes which are positioned on the outer sides of the second heat pipes 288. By adopting this configuration, the length of the second heat pipes 288 becomes longer than that of the first heat pipes 287 to thereby reduce the cooling efficiency somewhat. However, even with a light source having a plurality of device holders each including light emitting devices (heat generating devices), the cooling effect of cooling the light emitting devices (the heat generating devices) effectively remains unchanged. In this case, as a matter of convenience in facilitating the fabrication, it is desirable that the first heat dissipating fin 291 is rotated through 180 degrees so that the connecting portions 294 are positioned on an opposite side to the side where they are originally positioned.

While the embodiments of the invention have been described heretofore, these embodiments are presented as examples, and hence, there is no intention to limit the scope of the invention by the embodiments. These novel embodiments can be carried out in other various forms, and various omissions, replacements and modifications can be made without departing from the spirit and scope of the invention. Those resulting embodiments and their modifications are included in the spirit and scope of the invention and are also included in the scope of inventions claimed for patent under claims below and their equivalents.

What is claimed is:

1. An electronic device comprising:
   a first device holder and a second device holder each comprising a heat generating device attached thereto;
   a first heat conductive plate and a second heat conductive plate which are connected to the first device holder and the second device holder, respectively;
   a first heat dissipating fin which is disposed by the side of the second device holder which is disposed to lie adjacent to the first device holder;
   a second heat dissipating fin which is disposed adjacent to the first heat dissipating fin in the same direction as the first heat dissipating fin;
   two first heat pipes which connect the first device holder with the first heat dissipating fin so that heat can be conducted therebetween; and
   a second heat pipe which connects the second device holder and the second heat dissipating fin so that heat can be conducted therebetween and which is disposed between the two first heat pipes;
   an additional heat dissipating fin which is provided closer to the second heat conductive plate than the first heat dissipating fin;
   an additional device holder and an additional heat conductive plate which are provided closer to an opposite side to the heat dissipating fin than the first device holder; and
   two additional heat pipes which are disposed on outer sides of the first heat
   pipes to connect the additional heat conductive plate with the additional heat dissipating fin.

2. The electronic device according to claim 1, wherein the number of second heat pipes is one or two, and the heat pipes which can conduct heat to the heat dissipating fins other than the second heat dissipating fin are pairs of parallel heat pipes arrange to correspond individually to the heat dissipating fins other than the second heat dissipating fin.

3. The electronic device according to claim 2, wherein the heat dissipating fins excluding the second heat dissipating fin have a cutout portion or a through hole which is formed substantially at centers of the heat dissipating fins, and the heat pipes which can conduct heat to the heat dissipating fin which is disposed in a position which lies farther away from the device holder than the heat dissipating fins are accommodated in and passed through the cutout portion or the through hole.

4. The electronic device according to claim 3, wherein a tape member is provided on the heat dissipating fins having the cutout portion.

5. The electronic device according to claim 2, wherein the heat pipes which can conduct heat to the heat conductive plate are in contact with a rear surface of the heat conductive plate which is positioned closer to the heat dissipating fin than the heat conductive plate to which the heat pipes are fixed.

6. The electronic device according to claim 2, wherein the heat dissipating fins are each made up of a plurality of flat fin plates which stay at right angles to the heat pipes, and the plurality of fin plates are fixed to the heat pipes.

7. The electronic device according to claim 1, wherein the heat dissipating fins excluding the second heat dissipating fin have a cutout portion or a through hole which is formed substantially at centers of the heat dissipating fins, and the heat pipes which can conduct heat to the heat dissipating fin which is disposed in a position which lies farther away from the device holder than the heat dissipating fins are accommodated in and passed through the cutout portion or the through hole.

8. The electronic device according to claim 7, wherein a tape member is provided on the heat dissipating fins having the cutout portion.

9. The electronic device according to claim 1, wherein the heat pipes which can conduct heat to the heat conductive plate are in contact with a rear surface of the heat conductive plate which is positioned closer to the heat dissipating fin than the heat conductive plate to which the heat pipes are fixed.

10. The electronic device according to claim 1, wherein the heat dissipating fins are each made up of a plurality of flat fin plates which stay at right angles to the heat pipes, and the plurality of fin plates are fixed to the heat pipes.

11. A projector comprising:
the electronic device according to claim 1;
a display device on to which light emitted from the electronic device is shone to form image light;
a projection optical system for projecting the image light formed at the display device on to a screen; and
a projector control unit for controlling the display device and the electronic device, wherein
the heat generating device includes semiconductor light emitting device.

12. An electronic device comprising:
a holder block has a first device holder to which a heat generating device is attached, a second device holder disposed adjacent to the first device holder to which a heat generating device is attached, and a first heat conductive plate and a second heat conductive plate which are connected to the first device holder and the second device holder respectively and wherein the second heat conductive plate being disposed adjacent to the first heat conductive plate;
a heat sink which is disposed apart from the holder block and has a first heat dissipating fin and a second heat dissipating fin which is disposed adjacent to the first heat dissipating fin;
two first heat pipes which connect the first device holder with the first heat dissipating fin so that heat can be conducted therebetween; and
a second heat pipe which connects the second device holder with the second heat dissipating fin which is disposed at a position where a distance from the second device holder to the second heat dissipating fin is further away than a distance from the second device holder to the first heat dissipating fin so that heat can be conducted therebetween, and wherein the second heat pipe being disposed between the two first heat pipes.

* * * * *